United States Patent

Nonaka

[11] Patent Number: 6,013,002
[45] Date of Patent: Jan. 11, 2000

[54] ROTARY POWER TRANSMISSION APPARATUS

[75] Inventor: Hiroki Nonaka, Nissin, Japan

[73] Assignee: Toyota Jidosha Kabushiki Kaisha, Toyota, Japan

[21] Appl. No.: 09/167,499

[22] Filed: Oct. 7, 1998

[30] Foreign Application Priority Data

Oct. 14, 1997 [JP] Japan .................................. 9-296224

[51] Int. Cl.⁷ .................................................. F16H 13/06
[52] U.S. Cl. .................................. 475/5; 74/397; 74/399; 475/183
[58] Field of Search ............................ 74/380, 384, 396, 74/397, 398, 399; 475/1, 5, 183, 170; 476/31

[56] References Cited

U.S. PATENT DOCUMENTS

| | | | |
|---|---|---|---|
| 1,568,290 | 1/1926 | Morison | 74/52 |
| 1,596,511 | 8/1926 | Pistolesi | 74/395 |
| 3,945,270 | 3/1976 | Nelson et al. | 476/61 |
| 4,448,092 | 5/1984 | Binger | 74/397 X |
| 4,620,455 | 11/1986 | Kraus | 475/159 |
| 5,013,288 | 5/1991 | Parsons | 475/170 X |
| 5,095,767 | 3/1992 | Spridco et al. | 74/397 |
| 5,601,507 | 2/1997 | Hoogenberg | 475/170 X |

FOREIGN PATENT DOCUMENTS

| | | |
|---|---|---|
| 41 08 076 | 8/1992 | Germany . |
| 58-211811 | 12/1983 | Japan . |
| 58-211812 | 12/1983 | Japan . |
| 64-51211 | 2/1989 | Japan . |
| 3-115244 | 11/1991 | Japan . |

*Primary Examiner*—Sherry L. Estremsky
*Attorney, Agent, or Firm*—Oblon, Spivak, McClelland, Maier & Neustadt, P.C.

[57] ABSTRACT

A rotary power transmission apparatus for transmitting a rotary power from an input rotary member to an output rotary member eccentric from the input rotary member. The rotary power transmission apparatus comprises: a ring member arranged around the outer circumferences of the input rotary member and the output rotary member and made rotatable on an axis eccentric from those input rotary member and output rotary member; a first intermediate rotary member for transmitting a torque between the input rotary member and the ring member; a second intermediate rotary member for transmitting the torque between the ring member and the output rotary member; and a relative phase changing mechanism for changing the relative phases in the direction of revolution between the first intermediate rotary member and the second intermediate rotary member along the inner circumference of the ring member.

8 Claims, 4 Drawing Sheets

ROTARY POWER TRANSMISSION APPARATUS

BACKGROUND OF THE INVENTION

1. Field of the Invention

The present invention relates to an apparatus capable of transmitting a rotary power between an input rotary member and an output rotary member eccentric from each other and changing the eccentricity inbetween.

2. Related Art

In a rotary machining by a milling machine or the like, a plurality of diameters may be machined by a tool of one kind by changing the turning radius of the edge of the tool. In this case, not only the machining radius can be easily changed but also a complicated machining such as the cutting of a tapered face can be performed, if the structure, in which the edge is changed in position by attaching and detaching it to and from the tool body, is replaced by a mechanism for moving the edge radially of the tool body.

The mechanism capable of changing the turning radius of the tool edge continuously is disclosed in Japanese Patent Laid-Open No. 51211/1989. In the apparatus disclosed, a cylindrical holder body, as mounted on the rotary spindle of a machine tool, is provided at its leading end portion with a radially directed slide guide, with which the tool is movably engaged. Moreover, the holder body is equipped therein with a motor and a feed screw mechanism to be actuated by the motor, so that the tool may be moved along the slide guide by the feed screw mechanism. In the disclosed apparatus, therefore, the tool is moved along the slide guide by energizing the motor so that the edge position in the radial direction of the rotary spindle can be continuously changed even while the rotary spindle is rotating.

However, the aforementioned construction of the prior art is disadvantageously complicated because the motor and the feed screw mechanism have to be disposed in the rotary spindle. Since the center of rotation of the rotary spindle fails to be aligned with the center of gravity, moreover, the eccentric force for the eccentric load grows higher according to the increase in the number of rotation so that the number of rotation of the rotary spindle is disadvantageously restricted so as to prevent the vibration and to keep the rotating accuracy. In order to change the edge position or the cutting radius during the cutting operation, the motor in the rotating rotary spindle has to be energized. For this energization, contacts such as slip rings or brushes are mounted on the outer circumference of the rotary spindle. When this rotary spindle is turned at a high speed, however, insufficient contact or contact wear may probably occur to raise problems in the reliability and the durability.

Here, the Oldham's coupling, a universal joint or a flexible cylinder is known as the mechanism for transmitting a torque between the input and output sides which are eccentric from each other. However, these mechanisms of the prior art may be restricted in the transmittable torque and the number of rotation and may have to change the spacing between the input side member and the output side member so as to change the eccentricity. If this eccentricity is to be changed during the rotation, moreover, the necessary mechanism is disadvantageously complicated.

SUMMARY OF THE INVENTION

An object of the invention is to provide a rotary power transmission apparatus capable of easily changing the eccentricity of an output rotary member to an input rotary member and turning the same at a high speed.

According to the invention, therefore, there is provided a rotary power transmission apparatus for transmitting a rotary power from an input rotary member to an output rotary member made rotatable on an axis eccentric from that of the input rotary member, comprising: first drive means for turning the input rotary member on its center axis; a cylindrical member arranged around the outer circumferences of the input rotary member and the output rotary member and made rotatable on an axis eccentric from those of the input rotary member and the output rotary member; a first intermediate rotary member made rotatable on its axis in engagement with the outer circumference of the input rotary member and the inner circumference of the cylindrical member to transmit a torque between the input rotary member and the cylindrical member; a second intermediate rotary member made rotatable on its axis in engagement with the outer circumference of the output rotary member and the inner circumference of the cylindrical member to transmit the torque between the cylindrical member and the output rotary member; and a relative phase changing mechanism for changing the relative phases in the direction of revolution between the first intermediate rotary member and the second intermediate rotary member along the inner circumference of the cylindrical member.

According to the invention, therefore, the first intermediate rotary member is made rotatable on its axis without being revolved. If the input rotary member is turned in this state, the input rotary member, the first intermediate rotary member and the cylindrical member construct a mechanism similar to the planetary gear mechanism so that the cylindrical member rotates backward of the input rotary member. On the other hand, the cylindrical member, the second intermediate rotary member and the output rotary member construct a mechanism similar to the planetary gear mechanism, and the cylindrical member receives the torque from the input rotary member and rotates, as described above, so that the output rotary member rotates backward of the cylindrical member, i.e., in the same direction of the input rotary member. Since the cylindrical member is eccentric from the input rotary member and since the output rotary member is eccentric from the cylindrical member, moreover, the output rotary member is held in an eccentric position relative to the input rotary member by making the individual directions of eccentricity different. As a result, the torque is transmitted from the input rotary member to the output rotary member in the eccentric states to each other. In this case, all the members rotate on their individual center axes to generate neither the eccentric load nor the centrifugal force, as might be caused by the eccentric load, so that the high speed rotation can be achieved. If one of the intermediate rotary members is revolved by the relative phase changing mechanism to change the relative phases of the two intermediate rotary members, moreover, the relative direction of eccentricity between the input rotary member and the cylindrical member and the relative direction of eccentricity between the output rotary member and the cylindrical member change thereby to change the relative eccentricity between the input rotary member and the output rotary member. In short, it is possible to change the eccentricity of the output rotary member.

In addition to the construction described above, the invention can be equipped with a revolution mechanism for revolving the first and second intermediate rotary members at the same speed and in the same direction.

With this construction, therefore, the cylindrical member rotates on the axis of the input rotary member when the first intermediate rotary member revolves around the axis of the input rotary member. This rotation of the cylindrical member is eccentric with respect to the axis of the input rotary member. Simultaneously with this, the second intermediate rotary member revolves in the same direction so that the output rotary member engaging with the second intermediate rotary member revolves around the axis of the input rotary member. As a result, the output rotary member can be revolved with a radius of the eccentricity to the input rotary member while being rotated on its axis.

In addition to the construction described above, the invention can adopt a construction in which the relative phases in the direction of revolution between the first intermediate rotary member and the second intermediate rotary member while being the first and second intermediate rotary members being revolved in the same direction.

With this construction, therefore, the output rotary member is revolved with the radius of the eccentricity to the input rotary member while being rotated on its axis, as in the aforementioned construction. During this revolution, moreover, the relative phases of the individual intermediate rotary members in the revolution direction are changed to change the eccentricity of the output rotary member to the input rotary member so that the radius of revolution is changed during the revolution.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

DESCRIPTION OF THE PREFERRED EMBODIMENT

Figure 1:
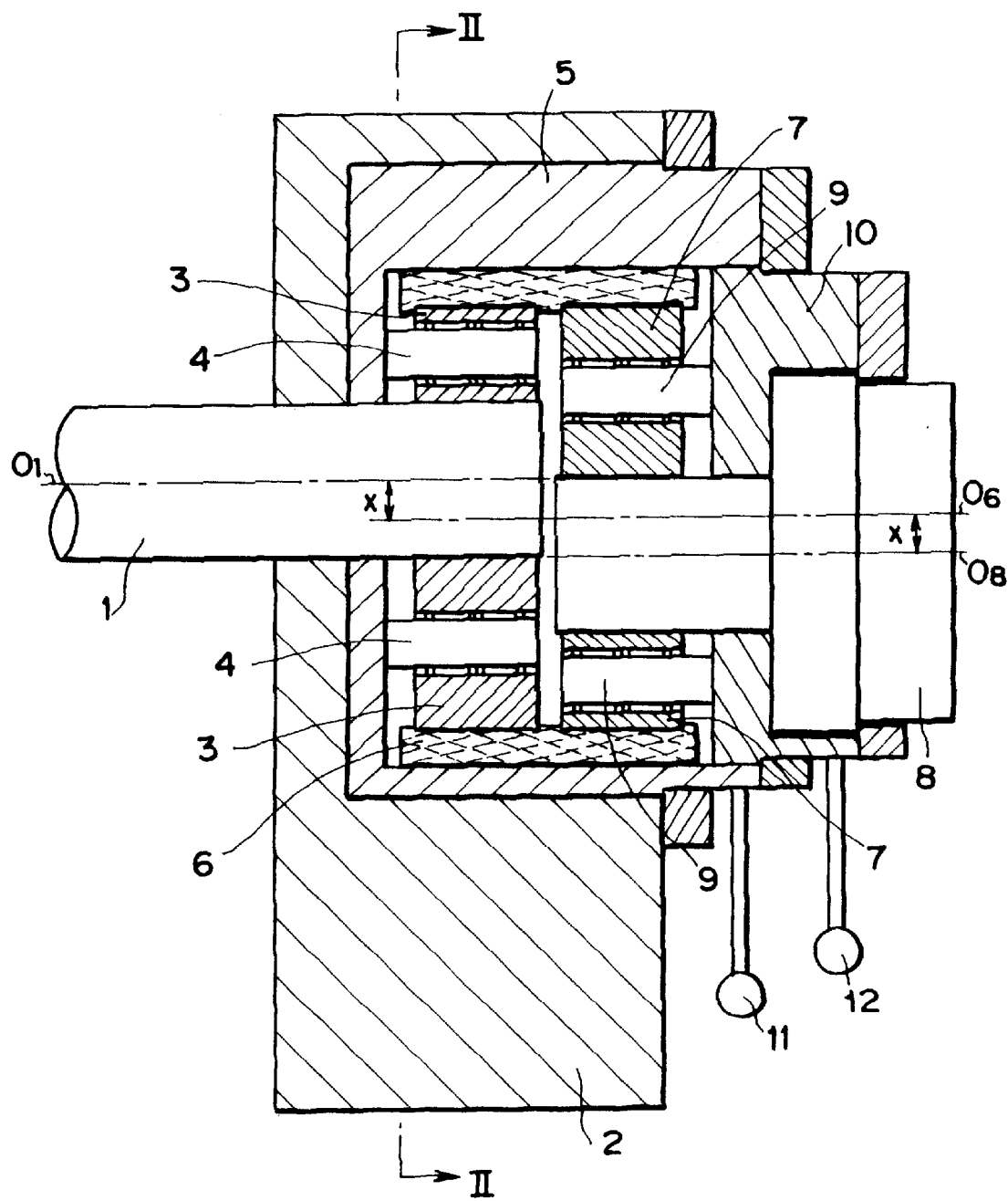
FIG. 1 is a section schematically showing one embodiment of an apparatus according to the invention.

The invention will be described more specifically with reference to the accompanying drawings. First of all, the fundamental construction of the invention will be described with reference to FIGS. 1 and 2. In these Figures, reference numeral 1 designates an input shaft acting as an input rotary member. This input shaft 1 is rotatably supported by a base 2 and is connected to a power source such as a not-shown motor. A plurality of (e.g., three, as shown) rollers 3 or intermediate rotary members having center axes in parallel with the center axis O1 of the input shaft 1 and having different external diameters are arranged to contact with the outer circumference of the input shaft 1 in a torque transmittable manner. Of these rollers 3, more specifically, the two rollers 3 are given equal external diameters whereas the remaining one roller 3 is given a smaller external diameter, and these three rollers 3 are arranged equidistantly in the circumferential direction on the outer circumference of the input shaft 1.

These rollers 3 are individually rotatably supported by support shafts 4, which are retained by a retaining member 5. In the shown example, the retaining member 5 is a cylindrical member, which is integrated at its one end portion with a side wall portion extended radially inward to mount the individual support shafts 4. Moreover, this cylindrical retaining member 5 is so rotatably retained by the base 2 as to rotate on the axis common to the center axis O1 of the input shaft 1.

Around the outer circumference of the input shaft 1 and on the inner circumference of the retaining member 5, there is rotatably arranged a cylindrical member 6 which corresponds to the ring member of the invention. Specifically, the cylindrical member 6 is so arranged on the outer circumferences of the three rollers 3 as to contact with them in a torque transmittable manner. Hence, the input shaft 1 and the cylindrical member 6 are made eccentric from each other by a predetermined size "x".

The input shaft 1, rollers 3 and cylindrical member 6 thus far described construct a mechanism similar to the planetary gear mechanism, in which: the input shaft 1 corresponds to the sun gear; the rollers 3 correspond to the planetary pinions; and the cylindrical member 6 corresponds to the ring gear. When the input shaft 1 rotates with the revolutions of the rollers 3 being stopped, i.e., with the retaining member 5 retaining the individual support shafts 4 being fixed, therefore, the individual rollers 3 rotate on their axes to transmit the torque to the cylindrical member 6 so that the cylindrical member 6 rotates backward of the input shaft 1. The number of rotations of the cylindrical member 6 in this case is determined by the ratio of the external diameter of the input shaft 1 and the internal diameter of the cylindrical member 6. Since this ratio is smaller than "1", the cylindrical member 6 is decelerated with respect to the input shaft 1 so that it rotates backward of the input shaft 1.

The cylindrical member 6 is extended to the front side (or to the right of FIG. 1) of the leading end portion of the input shaft 1, and three rollers 7 having a construction identical to that of the aforementioned rollers 3 are arranged on the inner circumference of the extension of the cylindrical member 6 at the leading end side of the input shaft 1. Specifically, two rollers 7 of a larger diameter and one roller 7 of a smaller diameter are arranged at a predetermined interval. At the center of the space enclosed by those three rollers 7, moreover, there is arranged an output shaft 8 which is in contact with the three rollers 7 in a torque transmittable manner.

This output shaft 8 corresponds to the output rotary member of the invention, and the three rollers 7 at the side of the output shaft 8 correspond to the second intermediate rotary members of the invention. These three rollers 7 are rotatably supported by support shafts which are directed in parallel with the axis of the input shaft 1. Hence, the output shaft 8 has a center axis O8 in parallel with the center axis O1 of the input shaft 1.

The support shafts 9 supporting the rollers 7 are individually retained by a retaining member 10 which can rotate on an axis aligned with the center axis O1 of the cylindrical member 6. Moreover, this retaining member 10 is rotatably fitted in the inner circumference of the first-named retaining member 5 having a cylindrical shape. On the other hand, the output shaft 8 rotatably extends through the retaining member 10. As a result, the retaining member 5 on the side of the input shaft 1 is rotatably retained by the base 2 to retain the retaining member 10 on the side of the output shaft 8 in a rotatable manner, and the output shaft 8 is rotatably retained by the retaining member 10.

The output shaft 8, the rollers 7 and the cylindrical member 6 construct a mechanism similar to the planetary gear mechanism, in which: the output shaft 8 corresponds to the sun gear; the rollers 7 correspond to the planetary pinions; and the cylindrical member 6 corresponds to the ring gear. When the cylindrical member 6 rotates with the revolutions of the rollers 7 being stopped, i.e., with the retaining member 10 retaining the individual support shafts 9 being fixed, therefore, the individual rollers 7 rotate on their axes to transmit the torque from the rollers 7 to the output shaft 8 so that the output shaft 8 rotates backward of the cylindrical member 6. The number of rotations of the output shaft 8 in this case is determined by the ratio of the external diameter of the output shaft 8 and the internal diameter of the cylindrical member 6. Since this ratio is smaller than "1", the output shaft 8 is accelerated with respect to the cylindrical member 6 so that it rotates backward of the cylindrical member 6.

There are further provided turning units 11 and 12 for turning those retaining members 5 and 10, respectively. These turning units 11 and 12 are given functions to turn the individual retaining members 5 and 10 at the same speed in the same direction and to turn one retaining member 5 relative to the other retaining member 10 thereby to change the rotary phases of the two, i.e., the relative phases in the direction of revolution. Hence, these turning units 11 and 12 correspond to a relative phase changing mechanism of the invention. These turning units 11 and 12 also correspond to a revolution mechanism of the invention because they revolve the output shaft 8 and changes the eccentricity of the output shaft 8, as will be described hereinafter.

In the structure thus far described, the input shaft 1, the rollers 3, the cylindrical member 6, the rollers 7 and the output shaft 8 are constructed to contact with one another in an arcuate plane thereby to transmit the torque. As a result, the transmittable torque is restricted by their contact pressure, and it is desired transmitting the demanded torque to raise the contact pressures of those members. These contact pressures between the members are desirably raised by press-fitting or shrinking the individual rollers 3 and 7, the input shaft 1 and the output shaft 8 in the cylindrical member 6. Since these members construct a mechanism corresponding to the planetary gear mechanism, as described hereinbefore, they can be individually replaced by gears. Specifically: the input shaft 1 and the output shaft 8 may be replaced by external gears; the individual rollers 3 and 7 may be replaced by pinion gears; and the cylindrical member 6 may be replaced by an internal gear (or a ring gear). Hence, it should be understood that the terminologies "outer circumferential portion" or "inner circumferential portion", as defined in Claims, contain both the outer circumference or inner circumference for transmitting the torque frictionally and the external or internal teeth meshing with each other for the torque transmissions.

Here will be described the actions of the mechanism thus far described. The first description will be made on the transmission of the torque from the input shaft 1 to the output shaft 8. When the not-shown power source such as the motor is started, the input shaft 1 rotates on its axis because it is rotatably retained by the base 2. In this case, the rollers 3 are rotated on their axes by the rotation of the input shaft 1 if the individual turning units 11 and 12 are stopped to fix the retaining members 5 and 10 thereby to stop the revolutions of the individual rollers 3 and 7. In accordance with the rotations of the rollers 3, the cylindrical member 6 corresponding to the ring member rotates backward of the input shaft 1 on its center axis O6. The ratio between the numbers of rotations of the input shaft 1 and the cylindrical member 6 in this case is a reduction ratio based on the ratio between the external diameter of the input shaft 1 and the internal diameter of the cylindrical member 6.

On the side of the output shaft 8, the cylindrical member 6 rotates with the revolution of the rollers 7 corresponding to the second intermediate rotary member being stopped. As a result, the torque is transmitted through the rollers 7 to the output shaft 8 so that the output shaft 8 rotates on its center axis O8. The ratio between the numbers of rotations of the cylindrical member 6 and the output shaft 8 in this case is an acceleration ratio based on the ratio between the internal diameter of the cylindrical member 6 and the external diameter of the output shaft 8. As a result, the deceleration is established between the input shaft 1 and the cylindrical member 6 whereas the acceleration is established between the cylindrical member 6 and the output shaft 8, so that the numbers of revolutions of the input shaft 1 and the output shaft 8 are hardly different even with the difference in the internal and external diameters among the input shaft 1, the output shaft 8 and the cylindrical member 6. More specifically, the input shaft 1 and the output shaft 8 rotate at the same number of rotation, if they have the same external diameter, but the acceleration/deceleration occurs according to the ratio of the external diameters of the input shaft 1 and the output shaft 8 if these external diameters are different.

Figure 2:
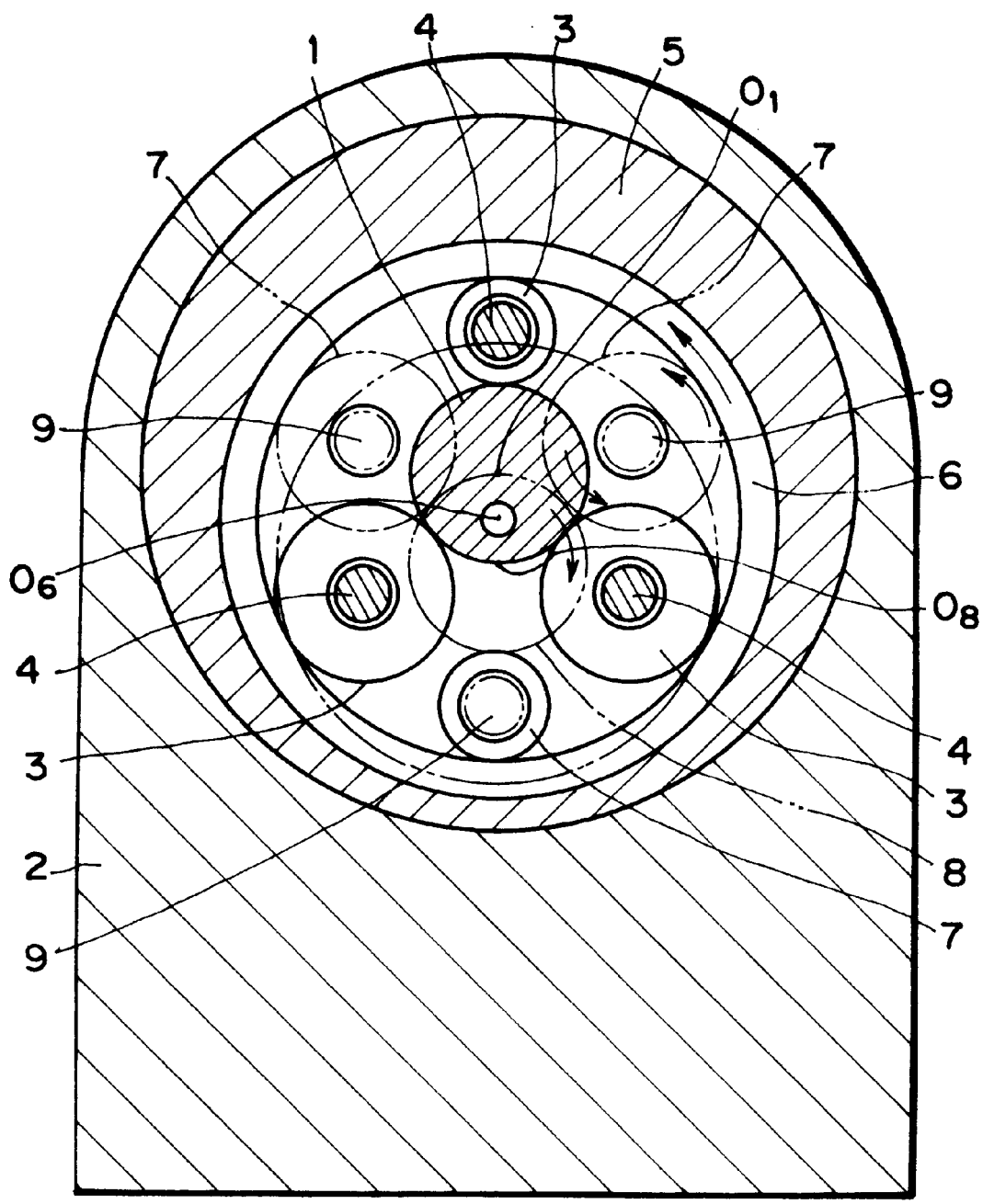
FIG. 2 is a section taken along line II—II of FIG. 1.

Here will be described the actions for changing the eccentricity between the input shaft 1 and the output shaft 8. FIGS. 1 and 2 show the state in which the eccentricity takes the maximum. In the shown example, the maximum eccentricity is "2x" because the input shaft 1 and the output shaft 8 have the same external diameter. In short, the cylindrical member 6 is eccentric by the predetermined size "x" with respect to the input shaft 1. The rollers 7 on the side of the output shaft 8 are revolved around the cylindrical member 6.

These revolutions of the rollers 7 are performed by turning the retaining member 10 retaining the support shafts 9 of the rollers 7. Since the center axis of the retaining member 10 is aligned with that of the cylindrical member 6, however, the retaining member 10 and the output shaft 8 supported by the rollers 7 revolve around the center axis O6 of the cylindrical member 6. Specifically, the output shaft 8 moves on a circle of the radius "x" around the center axis O6 of the cylindrical member 6. Since the input shaft 1 and the cylindrical member 6 are eccentric by the predetermined size "x", on the other hand, the output shaft 8 revolves by 180 degrees from the shown position so that the center axis O8 of the output shaft 8 comes into alignment with the center axis O1 of the input shaft 1. By thus turning one retaining member 10 relative to the other retaining member 5, that is, by moving the rollers 7 corresponding to the second intermediate rotary member in the direction of revolution relative to the rollers 3 corresponding to the first intermediate rotary member to change their relative phases, the spacing (or eccentricity) between the center axis O1 of the input shaft 1 and the center axis O8 of the output shaft 8 changes in the range of 0 to "2x". Here, the change in the eccentricity of the output shaft 8 with respect to the input shaft 1 can be made by turning either or both of the retaining members 5 and 10 by the aforementioned turning units 11 and 12 thereby to make their rotary phases different.

Here will be described the actions to revolve the output shaft 8. The individual retaining members 5 and 10 are turned at the same speed and in the same direction by the turning units 11 and 12. This is similar to the state in which the individual retaining members 5 and 10 are integrally connected and turned together. Thus, the rollers 3 and 7, as retained by the retaining members 5 and 10, respectively, through the support shafts 4 and 9, are revolved while keeping their relative positional relations without any change in their relative phases. As a result, the shown apparatus rotates as a whole on the center axis O1 of the input shaft 1 so that the rotating locus of the output shaft 8 is a circuit having a center on the center axis O1 of the input shaft 1 and the relative eccentricity as its radius. In short, the output shaft 8 revolves along the circumference of such circle.

Here, the transmission of the torque from the input shaft 1 to the output shaft 8, the change in the eccentricity of the output shaft 8 relative to the input shaft 1, and the revolutions of the output shaft 8, as have been described hereinbefore, can be performed in the individually superposed manners. In other words, the output shaft 8 can be turned while changing its eccentricity or revolved, or can be rotated or revolved while changing its eccentricity. For these actions, the individual retaining members 5 and 10 are turned or caused to establish relative rotations by controlling the individual turning units 11 and 12 while driving the input shaft 1.

Figure 3:
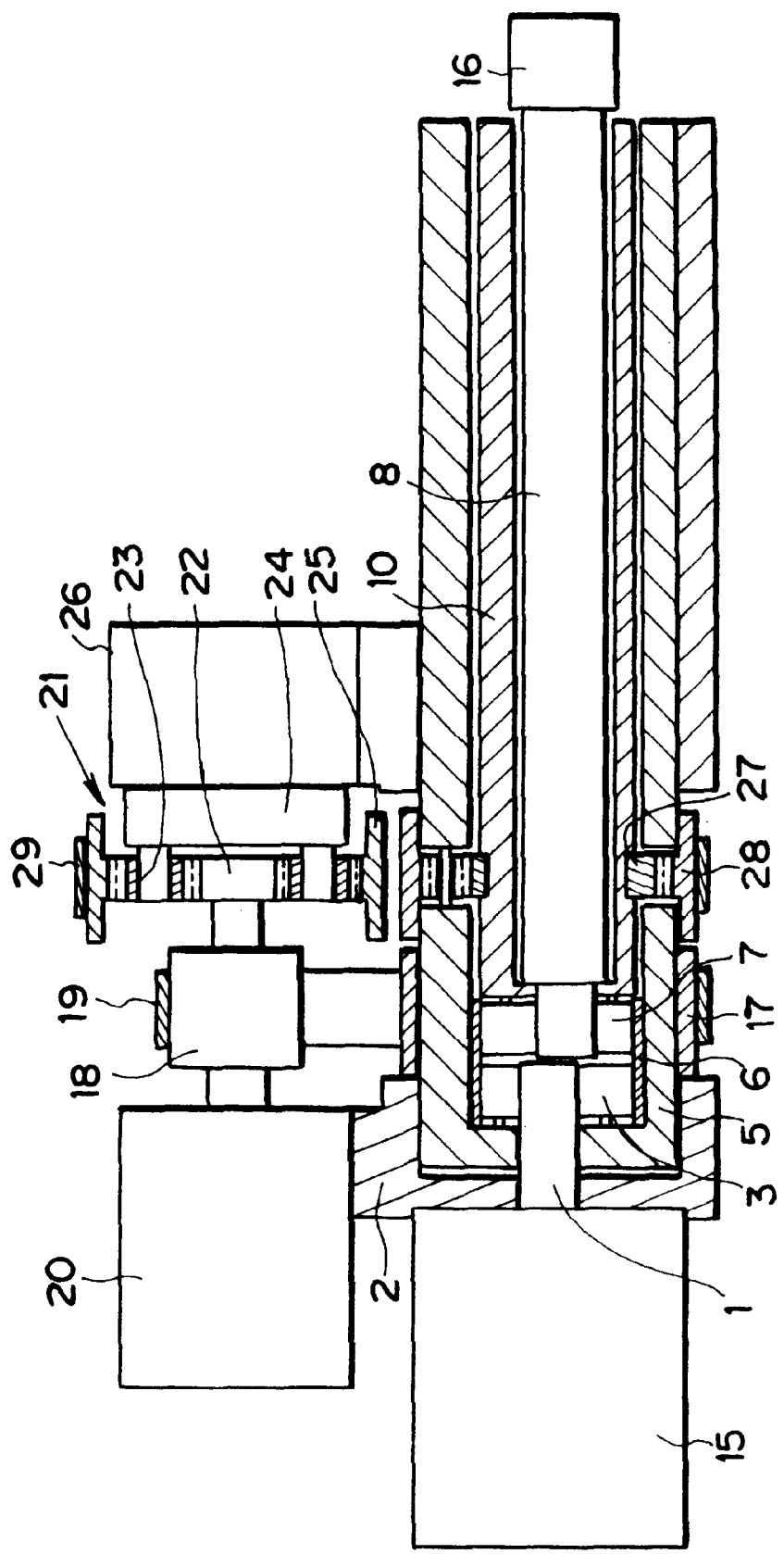
FIG. 3 is a section schematically showing one embodiment of a spindle head of a cutting machine employing an apparatus according to the invention.

FIG. 3 schematically shows one embodiment of the spindle head of a cutting machine employing the apparatus thus far described. Here, the portions in FIG. 3, as identical to those of FIGS. 1 and 2, are designated by the reference numerals employed in FIGS. 1 and 2, and their description will be omitted.

On the base 2, there is fixed a spindle motor 15, to which the input shaft 1 is connected. Here, the construction may be modified such that the output of the spindle motor 15 is used as the input shaft. On the other hand, the output shaft 8 is extended long in the opposite direction to the input shaft 1 and is equipped with a chuck 16 for chucking a (not-shown) cutting tool such as a milling cutter. Hence, the output shaft 8 is constructed as a tool shaft. Moreover, the retaining member 10 on the side if the output shaft 8 is formed into a relatively long cylindrical member extended axially like the output shaft 8.

With the outer circumference of the retaining member 5 on the side of the input shaft 1, on the other hand, there is integrated a driven pulley 17, and a drive pulley 18 is arranged outside of the outer circumference and in parallel with the driven pulley 17. Moreover, a timing belt 19 is made to run on those driven pulley 17 and drive pulley 18.

This drive pulley 18 is equipped with shafts protruded in the axial direction to the two sides, and the lefthand shaft, as seen in FIG. 3, is connected to a revolution shaft motor 20. Here, this lefthand shaft may be replaced by the output shaft of the revolution shaft motor 20. On the other hand, the righthand shaft, as seen in FIG. 3, is connected to a sun gear 22 in a planetary gear mechanism 21. This planetary gear mechanism 21 is constructed to include: the sun gear 22; a plurality of pinion gears 23 meshing with the sun gear 22 for rotations and revolutions; a carrier 24 retaining those pinion gears 23; and a ring gear 25 meshing with the pinion gears 23. Moreover, the carrier 24 is connected to a phasing motor 26. This phasing motor 26 is provided for setting the eccentricity of the output shaft 8 with respect to the input shaft 1, as will be described hereinafter, and may preferably be exemplified by a motor such as a step motor capable of setting the rotary phase finely and accurately. Here, this phasing motor 26 is mounted on a predetermined stationary portion of the base 2.

With the portion, as located at the radially outer side of the planetary gear mechanism 21, of the outer circumference of the retaining member 10 on the side of the output shaft 8, on the other hand, there is integrated an external gear 27, which is meshed by an internal gear 28 made rotatable on the center axis of the input shaft 1. This internal gear 28 provides a driven pulley whereas the aforementioned ring gear 25 provides a drive pulley. Thus, a timing belt 29 is made to run on these internal gear 28 and ring gear 25.

When the input shaft 1 is turned by the spindle motor 15 in the spindle head, as shown in FIG. 3, the output shaft 8 rotates on its axis in the same direction as that of the input shaft 1. The ratio of the numbers of rotations in this case is determined by the ratio between the external diameters of the input shaft 1 and the output shaft 8, as has been described hereinbefore. When the torque is to be transmitted by means of the gears, the ratio between the numbers of rotations of the input shaft 1 and the output shaft 8 is determined by the ratio between the tooth number of the input shaft 1 and the tooth number of the output shaft 8.

When the revolution shaft motor 20 is started, on the other hand, its torque is transmitted to rotate the retaining member 5 on the side of the input shaft 1 through the drive pulley 18, the timing belt 19 and the driven pulley 17. The torque of the revolution shaft motor 20 is transmitted on the other hand to rotate the sun gear 22 of the planetary gear mechanism 21. In this planetary gear mechanism 21, therefore, the sun gear 22 acts as the input element whereas the ring gear 25 acts as the output element. Thus, the torque is transmitted from the ring gear 25 through the timing belt 29 to the external gear 28 and further from this external gear 28 to the internal gear 27 so that the retaining member 10 on the side of the output shaft 8 rotates. In other words, the rollers 7 on the side of the output shaft 8 revolve.

In this case, the retaining member 5 on the side of the input shaft 1 rotates while being accelerated/decelerated according to the ratio between the external diameters of the drive pulley 18 and the driven pulley 17 (or the ratio between the numbers of gears meshing with the timing belt 19). In the planetary gear mechanism 21, moreover, the output rotation, i.e., the number or direction of rotation of the ring gear 25 is determined by the number and direction of rotation of the carrier 24. Moreover, a speed change is made between the ring gear 25 and the external gear 28 and between the external gear 28 and the internal gear 27. By turning the carrier 24 in a predetermined direction and at a predetermined number of rotation by the phasing motor 26, therefore, the gear ratio of the torque transmission path from the revolution shaft motor 20 to the retaining member 10 on the side of the output shaft 8 is equalized to that of the torque transmission path from the revolution shaft motor 20 to the retaining member 5 on the side of the input shaft 1. With this setting, the rollers 3 on the side of the input shaft 1 and the rollers 7 on the side of the output shaft 8 revolve in the same direction and at the same speed so that the output shaft 8 revolves around the center axis of the input shaft 1.

By changing the relative rotary phases between the rollers 3 on the side of the input shaft 1 and the rollers 7 on the side of the output shaft 8, as has been described in connection with the fundamental construction shown in FIGS. 1 and 2, moreover, the eccentricity of the output shaft 8 to the input shaft 1 is changed. If, therefore, a relative rotation of one of the revolution shaft motor 20 and the phasing motor 26 to the other is caused with the individual retaining members 5 and 10 being turned in the same direction and at the same speed by the motors 20 and 26 or with both the motors 20 and 26 being stopped to interrupt the rotations of the retaining members 5 and 10, relative revolutions of the rollers 3 or 7 to those of the other rollers are caused to change the rotary phases of the two so that the eccentricity of the output shaft 8 to the input shaft 1 increases/decreases.

The change in the eccentricity thus made can be made in the state in which the output shaft 8 is being revolved or not. Thus, the mechanism including the revolution shaft motor 20 and the phasing motor 26 for turning the individual retaining members 5 and 10 and the timing belts 19 and 29 for transmitting the torques of the motors 20 and 26 corresponds to the revolution mechanism of the invention.

In the spindle head adopting the apparatus of the invention shown in FIG. 3, therefore, the revolution radius of the cutting tool can be changed to work holes of different diameters with a single tool thereby to improve the working efficiency and to lower the cost for the tool. In the spindle head shown in FIG. 3, moreover, the output shaft 8 can be changed in its revolution radius while being revolved, so that the revolution radius of the tool can be changed during the cutting operation. By making use of this function, it is possible to facilitate a complicated working such as the cutting of a tapered hole or the recessing for increasing the internal diameter in an intermediate portion of a hole.

Especially the spindle head, shown in FIG. 3, is constructed by combining the simple rotary members so that a high-speed rotation can be achieved with little restriction on the number of rotation by the centrifugal force even in the centering operation for which the tool is revolved while being rotated on its axis. As a result, a cutting apparatus embodying the invention can improve the working efficiency for the centering operation better than the prior art.

Figure 4:
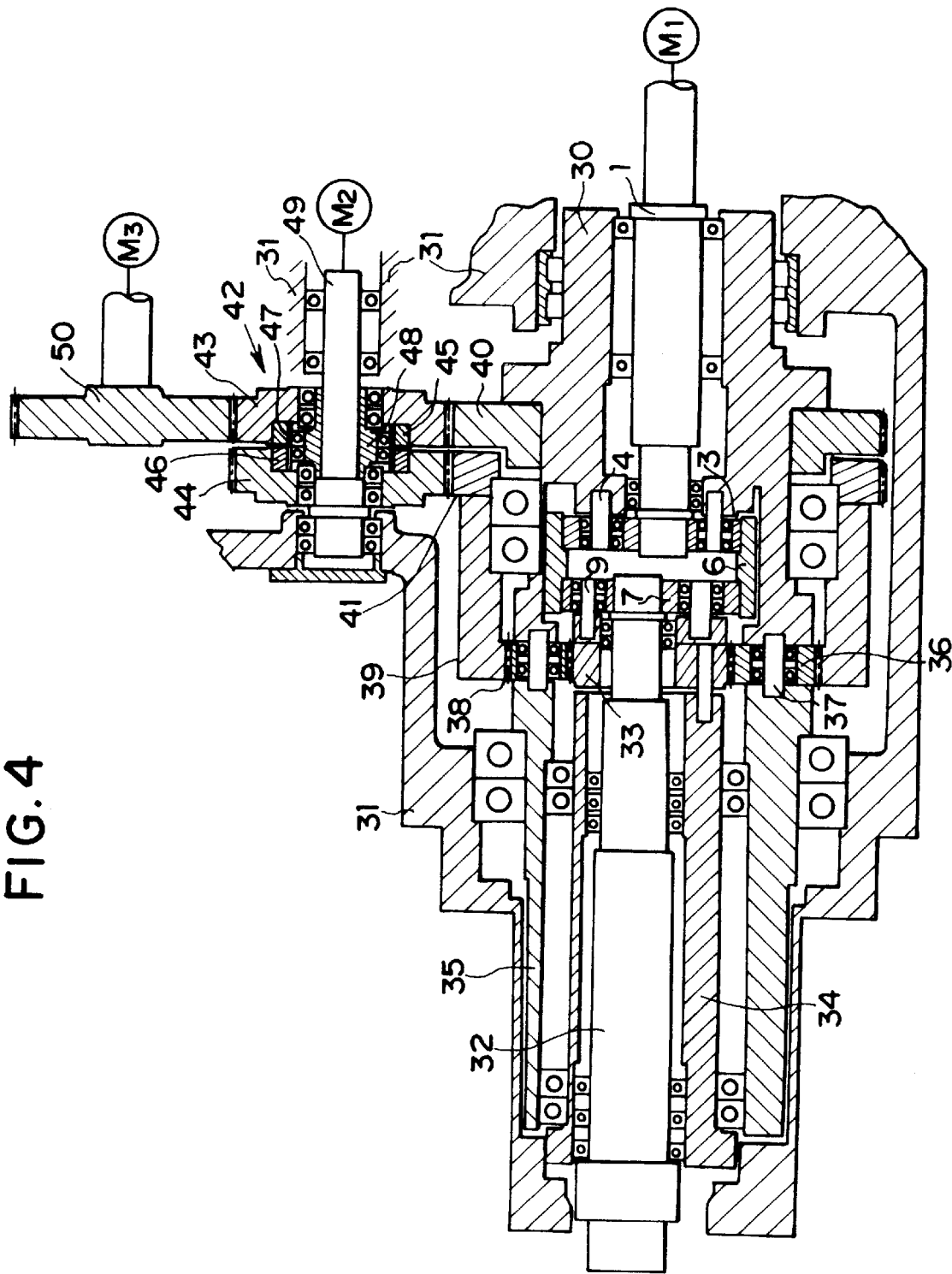
FIG. 4 is a section schematically showing another embodiment of a spindle head of a cutting machine employing an apparatus according to the invention.

FIG. 4 shows another embodiment of the spindle head using the rotary power transmission apparatus of the invention. The shown embodiment employs a differential mechanism as the mechanism for changing the revolution radius. Specifically, a revolution shaft 30 corresponding to the aforementioned retaining member is formed into a hollow shaft and is rotatably retained in a housing 31 by a plurality of bearings. In this revolution shaft 30, moreover, there is rotatably held by a plurality of bearings the input shaft 1, to which a spindle turning motor M1 is connected.

Moreover, the revolution shaft 30 is radially enlarged at its leading end portion (as located at the lefthand side of FIG. 4), and the rotary power transmission apparatus according to the invention is arranged in that radially large portion. Specifically, the cylindrical member 6 is arranged in alignment with the revolution shaft 30, and the plurality of rollers 3 of different external diameters are press-fitted between the inner circumference of the cylindrical member 6 and the outer circumference of the leading end portion of the input shaft 1. In other words, the rollers are so held in close contact with the input shaft 1 and the cylindrical member 6 as to transmit the torque. Moreover, the support shafts 4 supporting the rollers 3 rotatably are mounted on the revolution shaft 30 so that the rollers 3 revolve around the revolution shaft 30 as this revolution shaft 30 rotates.

Moreover, a spindle 32 corresponding to the output shaft 8 is inserted at its trailing end portion into the cylindrical member 6, and the plurality of rollers 7 of different external diameters are press-fitted like the rollers 3 between the outer circumference of the spindle 32 and the inner circumference of the cylindrical member 6. The support shafts 9 supporting the rollers 7 rotatably are connected to gears 33 which are rotatably arranged on the outer circumference of the spindle 32 through bearings. On the outer circumference of the spindle 32, moreover, there are rotatably fitted through bearings radius changing shafts 34 to which the gears 33 are connected by means of pins.

As a result, the torque of the input shaft 1 is transmitted to the cylindrical member 6 through the rotations of the rollers 3 contacting with the outer circumference of the input shaft 1, and the torque of the cylindrical member 6 is transmitted to the spindle 32 through the rotations of the other rollers 7 closely contacting with the inner circumference of the cylindrical member 6. Moreover, the individual rollers 3 and 7 revolve relative to each other to change the eccentricity of the spindle 32 to the input shaft 1, i.e., the revolution radius of the spindle 32. As the input shaft 1 rotates, the individual rollers 3 and 7, the cylindrical member 6 and the spindle 32 rotate so that the spindle 32 rotates on its axis.

A cylindrical revolution shaft 35 is rotatably fitted around the outer circumference of the radius changing shaft 34 through bearings. The trailing end portion of the revolution shaft 35 and the leading end portion of the revolution shaft 30 are opposed to each other at a spacing around the outer circumferences of the gears 33, and a plurality of intermediate gears 36 meshing with the gears 33 are arranged between the end portions of those revolution shafts 35 and 30. The intermediate gears 36 revolve around the axis of the input shaft 1 and are exemplified by a plurality of gears having different external diameters matching the eccentricity of the spindle 32 to the input shaft 1.

Support shafts 37 supporting those intermediate gears 36 are fitted in the individual revolution shafts 30 and 35 so that these revolution shafts 30 and 35 are so connected by the support shafts 37 as to revolve integrally with each other. Moreover, the individual intermediate gears 36 mesh with a revolution radius changing gear 38 or an internal gear. This revolution radius changing gear 38 is formed in the inner circumference of the leading end portion of a cylindrical shaft 39. Moreover, this cylindrical shaft 39 is arranged around the outer circumference of the revolution shaft 30 and fitted in alignment with the input shaft 1 and are rotatably retained by a bearing. On the other hand, the revolution shaft 35 on the leading end side is rotatably supported by the housing 31 through a bearing fitted on its outer circumference.

A revolution shaft gear 40 is fixed on the outer circumference of the revolution shaft 30, as located around the outer circumference of the input shaft 1, and an intermediate shaft gear 41, as arranged adjacent to the revolution shaft gear 40, is fixed on the cylindrical shaft 39. The revolution shaft gear 40 meshes with an input gear 43 in a differential mechanism 42, and the intermediate shaft gear 41 meshes with an output gear 44 in the differential mechanism 42.

Here will be described the differential mechanism 42. This deferential mechanism 42 is constructed to include: a pair of circular splines 45 and 46 splined in their inner circumferences; a flexible spline 47 of a flexible cylinder splined in its outer circumference to mesh with the circular splines 45 and 46; and a wave generator 48 having a ball bearing fitted on the outer circumference of an elliptic cam and fitting the flexible spline 47 on the outer circumference thereof One circular spline 45 and the flexible spline 47 are set to have equal tooth numbers (e.g., 200), and the circular spline 45 is fixedly fitted in the inner circumference of the input gear 43. On the other hand, the other circular spline 46 is set to have a slightly larger tooth number (e.g., 202) than that of the flexible spline 47 and is fixedly fitted in the inner circumference of the output gear 44. Moreover, the wave generator 48 is fixedly fitted on an adjusting shaft 49, which is connected to a radius changing motor M2.

In this differential mechanism 42, therefore, the flexible spline 47 rotates at the same number of rotation as that of the input gear 43 when this input gear 43 is turned with the wave generator 48, i.e., the adjusting shaft 49 being fixed, because the tooth number of the circular spline 45 fixed on the input gear 43 is equal to that of the flexible spline 47. Since the tooth number of the circular spline 46 fixed on the output gear 44 is larger than that of the flexible spline 47, on the contrary, the output gear 44 is turned while being decelerated according to its tooth number difference. In this embodiment, the output gear 44 is turned at the deceleration of 200/202=100/101, because the flexible spline 47 has the tooth number of "200" whereas the circular spline 46 has the tooth number of "202".

Thus, the numbers of rotation become different, but the tooth number ratio between the input gear 43 and the revolution shaft number 40 and the tooth number ratio between the output gear 44 and the intermediate shaft number 41 are so set that the revolution radius of the spindle 32 may not change even with the difference in the numbers of rotation. In case the input gear 43 has a tooth number of "100" whereas the revolution shaft gear 40 has a tooth number of "200", for example, the tooth number of the output gear 44 is set to "101", and the tooth number of the intermediate shaft 41 is set to "200". With this construction, the output gear 44 rotates at 100 RPM, and the revolution shaft gear 40 revolves at 101/2 RPM, when the input gear 43 is rotated at 101 RPM, for example, with the adjusting shaft 49, i.e., the wave generator 48 being fixed. Since the output gear 44 rotates at 100 RPM, moreover, the intermediate shaft gear 41 meshing with it rotates at 100×101/299=101/2 RPM. In short, the revolution shaft gear 40 and the intermediate shaft gear 41 rotate at the same speed.

As a result, the number of revolution of the revolution shaft 30 and the number of rotation of the cylindrical shaft 39 are equalized so that the revolution radius changing gear 38 formed on the cylindrical shaft 39, the intermediate gears 36 meshing with the gear 38 and the gears 33 meshing with the gears 36 rotate altogether. In short, the phases of the individual rollers 3 and 7 in the revolution direction kept constant.

Because of the difference in the tooth number between the flexible spline 47 and the circular spline 46 on the side of the output shaft 44, on the other hand, the circular spline 46 is decelerated with respect to the rotation of the flexible spline 47 at a deceleration rate according to the difference in the tooth number. With the tooth number difference of "2" in this embodiment, therefore, the circular spline 46 is decelerated at a ratio of 2/200=1/100 with respect to the rotation of the flexible spline 47. In other words, the circular spline 46 rotates with −1 RPM when the flexible spline 47 is rotated at 100 RPM together with the adjusting shaft 49. Here, no difference arises in the number of rotation between the circular spline 45 on the side of the input gear 43 and the flexible spline 47 because these splines have the equal tooth number. After all, a difference occurs between the rotary phases of the input gear 43 and the output gear 44 when the flexible spline 47 is rotated together with the adjusting shaft 49. Specifically, relative rotations can be established between the input shaft 43 and the output gear 44 at the rotary speed of 1/100 of the number of rotation of the adjusting shaft 49.

These relative rotations appear as those between the revolution shaft 30 and the gears 33, i.e., the relative revolution speeds between the individual rollers 3 and 7. Since the eccentricity of the spindle 32 to the input shaft 1, i.e., the revolution radius is changed by the relative revolutions between the individual rollers 3 and 7, moreover, the spindle head thus far described can adjust the revolution radius finely with ease. Here, reference numeral 50 appearing in FIG. 4 designates a revolution gear meshing with the input gear 43. This revolution gear 50 is connected to a revolution motor M3.

As in the embodiment shown in FIG. 3, moreover, the spindle head shown in FIG. 4 can not only turn the spindle 32 at a high speed but also revolve the spindle 32 while rotating it on its axis and can change the radius of the spindle 32 during the revolution. As a result, it is possible to perform the cutting of tapered holes, the working of a plurality of bores of different diameters and the recessing with ease.

Here, the invention should not be limited to the specific embodiments thus far described, but the revolution mechanism for revolving the intermediate rotary member on the input side and the intermediate rotary member on the output side may be other than the transmission means using the motors 20 and 26 and the timing belt, and the planetary gear mechanism, as shown in FIG. 3. On the other hand, the rotary power transmission apparatus of the invention can be applied not only to the spindle head of the cutting machine but also to a variety of machines for transmitting the torque. Moreover, the intermediate rotary member of the invention should not be limited to the single one for transmitting the torque by engaging it simultaneously with the input rotary member or the output rotary member and the ring member but may be composed of a plurality of rotary members which are connected in a torque transmittable manner.

Here will be summarized the advantages to be achieved by the invention. According to the invention, as has been described hereinbefore, the input rotary member and the output rotary member, as eccentric from each other, are arranged on the inner circumference of the ring member, and the intermediate rotary members for rotating to transmit the torque are individually arranged between the ring member and the input rotary member and between the ring member and the output rotary member. As a result, the torque can be transmitted from the input rotary member to the output rotary member through those intermediate rotary members and the ring member. By revolving at least one of the intermediate rotary members, moreover, it is possible to change the relative eccentricity between the input rotary member and the output rotary member. These functions to transmit the torque and to change the eccentricity are performed by turning the rotors such as the intermediate rotary members and the ring member so that any excessive centrifugal force is generated even at the large number of rotation for the torque transmission. According to the invention, therefore, it is possible to achieve far higher rotations than those of the prior art. If the relative phases of the individual intermediate rotary members in the revolution direction are changed, on the other hand, the eccentricity of the output rotary member can be changed to change/set the eccentricity easily.

According to the invention, moreover, the output rotary member is revolved by revolving both the intermediate rotary members so that the revolutions accompanied by the rotation of the output rotary member can be easily performed to achieve the high speed rotations, because there arises no special rotation obstructing cause such as the centrifugal force. According to the invention, still moreover, while the output rotary member is revolving, its eccentricity, i.e., the revolution radius can be changed to facilitate the various motions of the output rotary member. By making use of these functions, the rotary cutting tool is rotated on its axis and revolved to facilitate the complicated cutting operations.

What is claimed is:

1. A rotary power transmission apparatus which has an input rotary member and an output rotary member arranged on an axis eccentric from that of said input rotary member and rotated by a rotary power transmitting from the input rotary member, comprising:

first drive means for turning said input rotary member on its center axis;

a cylindrical member arranged around outer circumference of said input rotary member and said output rotary member and made rotatable on an axis eccentric from those of said input rotary member and said output rotary member;

a first intermediate rotary member made rotatable on its axis in engagement with the outer circumference of said input rotary member and an inner circumference of said cylindrical member to transmit a torque between said input rotary member and said cylindrical member;

a second intermediate rotary member made rotatable on its axis in engagement with the outer circumference of said output rotary member and the inner circumference of said cylindrical member to transmit the torque between said cylindrical member and said output rotary member; and a relative phase changing mechanism for changing relative phases in the direction of rotation between said first intermediate rotary member and said second intermediate rotary member by revolving the second intermediate rotary member along the inner circumference of said cylindrical member.

2. A rotary power transmission apparatus according to claim 1, wherein said relative phase changing mechanism includes a revolution mechanism for revolving both said first intermediate rotary member and said second intermediate rotary member at the same speed and in the same direction.

3. A rotary power transmission apparatus according to claim 1, wherein said relative phase changing mechanism includes: a first retaining member retaining said first intermediate rotary member rotatably on its axis and made rotatable on the same axis as the center axis of said input rotary member; second drive means for turning said first retaining member on its axis; a second retaining member retaining said second intermediate rotary member rotatably on its axis and made rotatable on its axis eccentric from those of said input rotary member and said output rotary member; and third drive means for turning said second retaining member on its axis.

4. A rotary power transmission apparatus according to claim 1, wherein said relative phase changing mechanism includes: a first retaining member retaining said first intermediate rotary member rotatably on its axis and made rotatable on the same axis as the center axis of said input rotary member; second drive means for turning said first retaining member on its axis; a hollow second retaining member retaining said second intermediate rotary member rotatably on its axis and made rotatable on an inner circumference side of said first retaining member on its axis eccentric from those of said input rotary member and said output rotary member; and third drive means for turning said second retaining member on its axis, and wherein said output rotary member is arranged rotatably on its axis in said second retaining member.

5. A rotary force transmission apparatus according to claim 4, further comprising:

a chuck carried on the leading end portion of said output rotary member for holding a tool.

6. A rotary power transmission apparatus according to claim 1, wherein said relative phase changing mechanism includes: a first retaining member retaining said first intermediate rotary member rotatably on its axis and made rotatable on the same axis as the center axis of said input rotary member; second drive means for turning said first retaining member on its axis; a first transmission mechanism for transmitting a torque from said second drive means to said first retaining member; a differential mechanism for differential actions by three rotary elements of a first one, a second one and a third one connected to said second drive means; a second retaining member retaining said second intermediate rotary member rotatably on its axis and made rotatable on its axis eccentric from those of said input rotary member and said output rotary member; a second transmission mechanism for transmitting the torque from said second rotary element to said second retaining member; and third drive means for turning said third rotary element selectively.

7. A rotary force transmission apparatus according to claim 6, wherein said first retaining member includes a hollow shaft made rotatable on the same axis as the center axis of said input rotary member, wherein said second retaining member includes a hollow shaft made rotatable on its axis eccentric from those of said input rotary member and said output rotary member and retained rotatably in the first-named hollow shaft, and wherein said output rotary member is rotatably retained in the second-named hollow shaft.

8. A rotary force transmission apparatus according to claim 7, further comprising:

a chuck carried on the leading end portion of said output rotary member for holding a tool.

* * * * *